United States Patent [19]
Patino et al.

[11] Patent Number: 5,200,688
[45] Date of Patent: Apr. 6, 1993

[54] VEHICULAR CHARGER

[75] Inventors: Joseph Patino, Plantation; Henry A. Bogut, Coral Springs, both of Fla.

[73] Assignee: Motorola, Inc., Schaumburg, Ill.

[21] Appl. No.: 708,572

[22] Filed: May 31, 1991

[51] Int. Cl.$^5$ .................. H02J 7/00; H01M 10/48
[52] U.S. Cl. .................... 320/13; 307/10.7; 455/89
[58] Field of Search ............ 320/13; 307/10.7; 455/89, 90

[56] References Cited

U.S. PATENT DOCUMENTS

| | | | |
|---|---|---|---|
| 3,979,657 | 9/1976 | Yorksie | 320/13 |
| 4,301,539 | 11/1981 | Kage | 375/107 |
| 4,513,446 | 4/1985 | Leslie | 455/73 |
| 4,726,052 | 2/1988 | Kato et al. | 379/61 |
| 4,761,631 | 8/1988 | Hwang | 340/520 |
| 4,812,838 | 3/1989 | Tashiro et al. | 340/825.6 |
| 4,962,543 | 10/1990 | Kuge et al. | 455/89 |
| 4,983,904 | 1/1991 | Iwahashi | 320/15 |
| 5,086,870 | 2/1992 | Bolduc | 180/333 |
| 5,155,428 | 10/1992 | Kang | 320/13 |

Primary Examiner—Steven L. Stephan
Assistant Examiner—Ben Davidson
Attorney, Agent, or Firm—Daniel K. Nichols; Pedro P. Hernandez

[57] ABSTRACT

A vehicular battery operated charger (202) for charging an electronic device such as a radio (204) includes a controller (218). Controller (218) determines the battery voltage of the vehicles battery (222) and compares it to a threshold level stored in controller (218). Charger (202) will automatically charge radio battery (206) as long as the voltage level of the vehicles battery (222) does not drop below the threshold level stored in controller (218).

10 Claims, 4 Drawing Sheets

VEHICULAR CHARGER

FIELD OF THE INVENTION

This invention relates generally to vehicular battery charging systems, and more specifically to a vehicular battery operated charger for charging battery operated radios.

BACKGROUND OF THE INVENTION

Vehicular battery chargers which run off vehicular batteries and supply electrical current to charge electronic devices such as battery operated radios are well known. Vehicular chargers are normally installed inside the passenger compartment of a vehicle (e.g. police car) in order to allow the radio user the capability of recharging the radio battery while inside the vehicle.

Present day battery chargers allow the radio user full use of the radio while the radio is being charged. Some of the more sophisticated radio chargers such as the SABER ™ Vehicular Adapter manufactured by Motorola, Inc. also includes features such as a built-in audio amplifier to increase the volume of any incoming radio calls while the radio is in the charger, as well as external annunciators and a remote microphone which allow the radio user full use of the radio while the radio is still charging.

The major drawback of present day vehicular chargers can be best illustrated by looking at FIG. 1 which shows the typical operating cycle of most present day chargers. A typical vehicular charger will first determine if the vehicle's ignition switch is in the "on" position (either in the accessory position or with the car running), as shown in decision step 102. If the ignition switch is in the "off" position, the battery charging will be discontinued as shown in step 104, and any ongoing radio charging will be immediately terminated. On the other hand, if the charger determines that the ignition switch is in the "on" position, the charger will enable the charging of any radio which is inserted into the charger as is shown in step 106. The major problem with the approach in FIG. 1 is that if a radio user leaves his radio in the charger while the radio is "on" and at the same turns "off" the ignition switch, the radio battery will begin to be discharged once the ignition switch is turned off and the radio user may come back to find a radio with a discharged vehicle battery.

Other types of present day chargers bypass the ignition switch of the vehicle altogether and connect directly to the vehicle's battery. The problem with these types of chargers is that if a radio is left inside the charger for a prolonged period of time without the vehicle being turned "on" there is a possibility of the vehicle's battery becoming discharged due to the current drain caused by the charging of radio.

A need exists in the art for a vehicular charger which can overcome the previously mentioned problems of either discharging the vehicle or radio batteries under certain situations. The charger must allow for a radio to be automatically charged while the vehicle is turned "off", yet at the same time not allow for the vehicle's battery to be depleted to the point that the vehicle will not be able to be started if the radio is left in the charger.

SUMMARY OF THE INVENTION

The vehicular battery operated charger for charging a battery operated electronic device, comprises a vehicular battery monitoring means for monitoring the voltage level of the vehicular battery and a control means responsive to said vehicular battery monitoring means. The control means including a storage means for storing a first threshold voltage level, the control means further including a comparison means for comparing the vehicular battery voltage level to the first threshold voltage level stored in the storage means and producing a first control signal when the vehicular battery voltage level drops below the first threshold voltage level. The vehicular battery operated charger also includes a charging means responsive to the control means for charging the electronic device battery.

DESCRIPTION OF A PREFERRED EMBODIMENT

Figure 1:
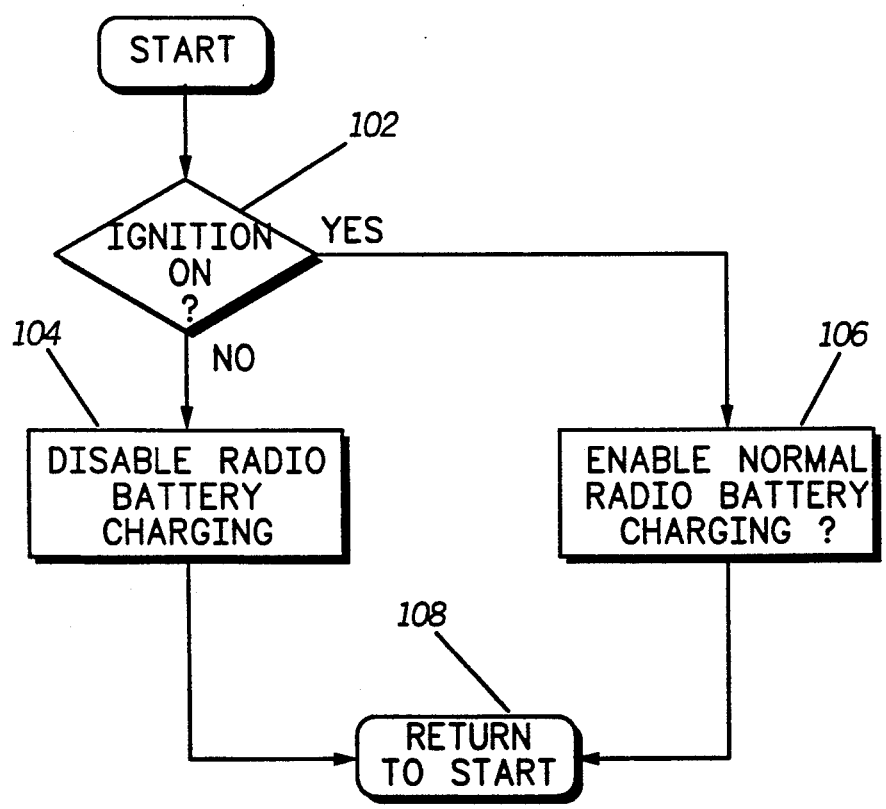
FIG. 1 is a flow diagram illustrating the charging sequence of a prior art vehicular charger.
Figure 2:
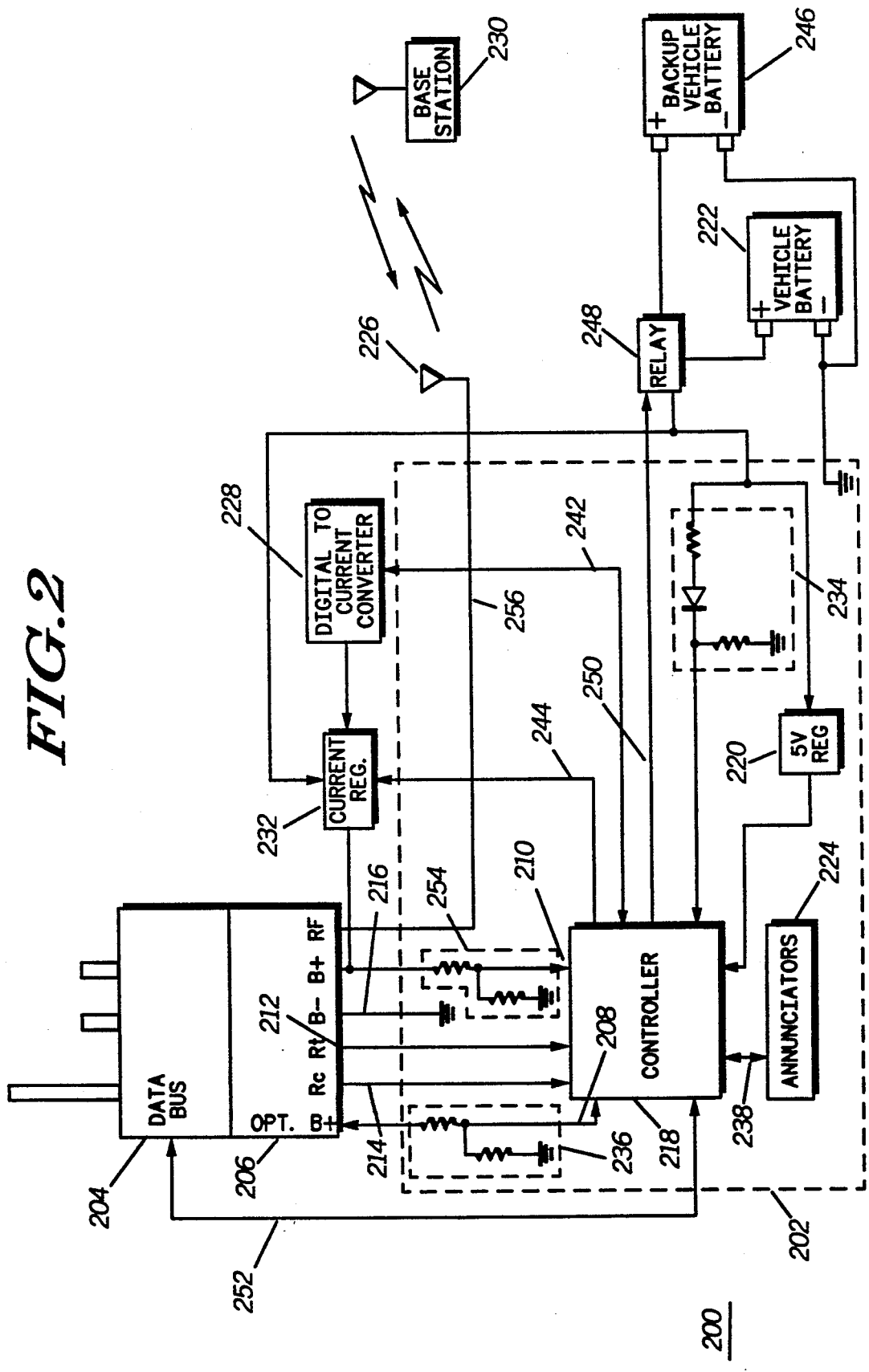
FIG. 2 is block diagram of a vehicular battery charging system in accordance with the present invention.

In FIG. 2, a block diagram of a vehicular charging system in accordance with the present invention is shown. Charging system 200 includes a vehicular charger 202 (sometimes called a vehicular adapter in the art) which is coupled to a vehicular battery 222 such as a standard car battery. Charger 202 charges radio battery 206 which is connected to battery operated radio 204. Radio 204 can be a conventional two-way radio having a transmitter and receiver such as an FM two-way radio, a cellular radio, etc. The present invention can also be utilized in other electronic devices which require charging such as pagers, computers, etc. Line 216 connects the radio battery ground terminal (B−) to the ground terminal of charger 202, while line 210 connects positive terminal (B+) to charger 202.

Preferably, charger 202 also couples to other terminals found in radio battery 206 such as terminal $R_t$ coupled via line 212 to controller 218. Terminal $R_t$ informs charger 202 if battery 206 can be safely rapid charged. The $R_t$ terminal is typically connected to a thermistor inside of battery 206 which changes resistance as the temperature of the battery increases. By measuring the voltage at the $R_t$ terminal of charger 202 the charger can safely charge battery 206 without overheating and damaging battery 206. Another terminal which is part of battery 206 is the $R_c$ terminal which couples to charger 202 via line 214. Terminal Rc informs charger 202 of the size (charge capacity) of radio battery 206 (i.e. high capacity) which is coupled to charger 202. Typically, a different resistance value will be associated with different sizes of radio batteries 206. For example a high capacity battery may have an internal resistance of 18 k$\Omega$ while a medium capacity battery might have a resistance of 5.1 k$\Omega$. The voltage at the Rc terminal is then read by the A/D converter inside of controller 218 via line 214. Controller 218 then correspondingly controls the charging means consisting of current regulator 232 and current converter 228 as to how much current is needed to charge the particular radio battery 206 which is attached to charger 202. For example, a 1500 mAh (milli-amp-hour) battery will charge at a charge rate of Capacity/3 (C/3) which is approximately 500 milli-amp per hour. Data bus 252 is coupled between radio 204 and controller 218 in order for charger 202 to communicate with radio 204. For example, a control means such as controller 218 can inform radio 204 to transmit a message to base station 230 when vehicle battery 222 drops below a given threshold level.

Finally, an electronic device condition detector means for determining when radio 204 is turned "on" or "off" is included. The detector means includes line 208 (option B+ line) which allows charger 202 to determine if radio 204 is currently in the "on" or "off" state. The option B+ terminal is coupled to resistor divider circuit 236 which converts the battery voltage typically 7.5 volts down to approximately 5 volts (operating voltage of charger 202). Line 208 then connects divider circuit 236 to a control means such as controller 218. Line 208 couples to another analog to digital (A/D) converter input which is part of controller 218. Controller 218 can vary the rate at which radio battery 206 is being charged at by controlling the charger charging means (current regulator 232 and current converter 228).

Controller 218 can be any of a number of microprocessors or microcontrollers that are commercially available such as a MC68HC11A8 (manufactured by Motorola, Inc.). The MC68HC11A8 includes on board storage means such as standard memory, I/O interface, 8 channel 8 bit A/D converter, and other features built right on board on the controller itself. Controller 218 also includes a comparison means which can be a conventional software algorithm stored inside of controller 218, which can compare the voltage levels coming in from both the vehilce battery via line 240 and radio battery via line 210 and compare them to the threshold voltage levels stored in controller 218. Although the preferred embodiment includes a conventional microcontroller 218 those skilled in the art will appreciate that the control means can be designed using discrete components forming comparator, timing, A/D and other well known circuits.

Also part of charger 202 is a voltage regulator 220 to convert the vehicle voltage coming in from battery 222 which is typically at 13.8 volts DC down to approximately 5 volts DC. Although the present invention is shown using a 5 volt operating voltage for the internal circuits of charger 202, any other voltage level which is commercially feasible can be utilized. Charger 202 also includes an annunciator means 224 which consists of a set of light emitting diodes (LEDs) and can also include an internal speaker if audio alerts are required. The annunicators are controlled by controller 218 via bus 238.

Charger 202 also includes a vehicular battery monitoring means consisting of voltage divider circuit 234, which is a conventional resistor divider circuit having a series diode for protection, and an A/D converter found in controller 218, and coupled via line 240. The resistor divider circuit could easily be implemented inside of controller 218 if desired, or if the operating voltage of controller 218 were raised to 13.8 volts there would be no need for divider circuit 234. The vehicular battery monitoring means monitors the voltage level of vehicle battery 222 in order to alert charger 202 when the voltage level has dropped to a predetermined level, such as when the battery is right about to become completely discharged. Also part of charger 202 is an electronic device monitoring means, consisting of voltage divider circuit 254 for reducing the voltage of radio battery 206 in order to interface with controller 218 and an A/D converter which is part of controller 218. Divider circuit 254 is in turn coupled to controller 218 via line 210. Line 210 is coupled to the A/D converter input, which is part of the electronic device monitoring means, and which compares the voltage level of battery 206 and converts it into a digital format for use by controller 218. The comparison means compares the inputted voltage level (digitally converted by the A/D converter) to the electronic device voltage threshold level stored inside of controller 218, in order to determine if the radio battery voltage has dropped below the predetermined level. Monitoring the voltage of radio battery 206 allows charger 202 to automatically stop charging the radio battery whenever the radio battery voltage is above a predetermined level (i.e. 7.0 volts).

Charger 202 also includes a charging means comprising a digital to current converter circuit 228 which is controlled via bus 242 from controller 218 and current regulator 232. Current regulator 232 also acts as a cut-off means for discontinuing the charging of battery 206 under the control of controller 218. Depending on such factors as the type of battery to be charged (as sensed via the Rc input to controller 218 and battery temperature (Rt) sensed via line 212), controller 218 will control the amount of current which will be allowed to be sent to radio battery 206 via current converter 228. Current regulator 232 is responsible for regulating the amount of current sent to radio battery 206 and is informed as to the amount of current to allow into battery 206 via current converter circuit 228. Whenever vehicle battery 222 drops below the predetermined threshold level a signal is sent from controller 218 to both current regulator 232 via line 244 and to current converter 228 via line 242 to terminate charging of radio battery 206, or to decrease the charge rate if that is the case.

Figure 3:
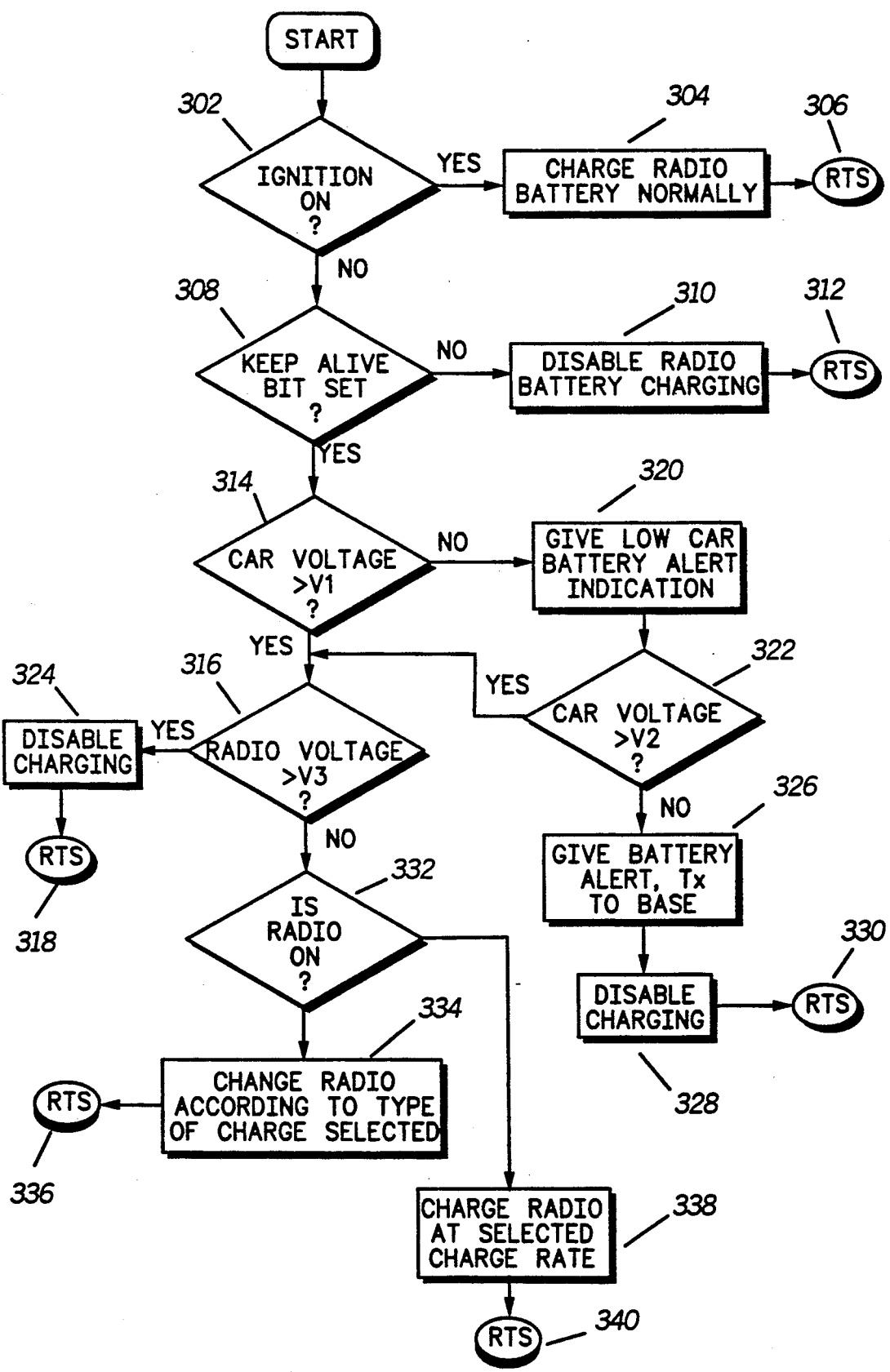
FIG. 3 is a flow diagram of a typical charging sequence in accordance with the present invention.

In FIG. 3 a typical charging sequence in accordance with the present invention is shown. In decision step 302, vehicular charger 202 determines if the vehicle's ignition switch is in the "on" state, if it is then in step 304 charger 202 charges the radio battery 204 using a normal charging cycle. Charger 202 then returns to the start (RTS) location of the flowchart in step 306. If in decision step 302 the ignition switch is determined to be in the "off" position, charger 202 then goes to step 308 to determine if the present invention is enabled by looking to see if a flag (option) bit is enabled in controller 218 which is stored in the controller's memory locations. If the option bit is not enabled, in step 310, the radio charging sequence is discounted and the charger returns to the start in step 312. If in step 308 the option bit is set, controller 202 will then determine if the vehicles battery voltage is above the first threshold level V1 stored in controller 218 in step 314.

If it is determined that the vehicle battery is below the V1 threshold in step 314 controller 218 in step 320 produces a first control signal that informs annunciators 224 to annuciate (i.e. LED lights up, etc.) to the charger user that the vehicle (i.e. car) battery is running low on charge. This can include automatically honking the car horn, turning on and off the vehicle lights, etc. The charging sequence is continued in step 320, although one could easily design charger 202 to immediately go into a trickle charge mode (or other battery conservation mode) as soon as the V1 threshold is passed (first control signal generated) in order to conserve the remaining vehicular battery capacity. In decision block 322 controller 202 will compare the vehicle battery voltage level coming in on line 240 with the second threshold voltage level (V2) stored in controller 218. If the battery voltage level is above the V2 threshold level the routine goes to step 316. If the voltage level is below the second threshold V2 in step 322 an automatic low battery alert is given to the radio user via annunciators 224 in step 326. This low battery alert is preferably different than the first low battery alert of step 320 (i.e. different LED lights up, different sounding alarm, etc.). Also in step 326 a message is transmitted from radio 204 via vehicular antenna 226 to base station 230 informing base station 230 that the vehicle's battery is dangerously low. The transmitted message can inform base station 230 which vehicle has the low battery condition. Base station 230 can also send a return message to charger 202 which can in turn activate a second reserve vehicular battery 246 automatically by way of a switching means such as relay 248 which is under the control of charger 202 via line 250, or perform another task such as to activate the vehicle's horn or lights to warn the radio operator of the low battery situation. An incoming message from base station 230 is received by radio 204 and processed and then sent to charger controller 218 via data bus 252. Data Bus 252 is normally formed by coupling a "universal connector found in radio 204 to a set of contact terminals found in charger 202, this is done automatically once radio 204 is placed inside of charger 202. Controller 218 then processes the data using conventional algorithms stored in controller 218. For example, the message may inform controller 218 to send a signal via line 250 in order to switch vehicle batteries from battery 222 to backup battery 246. Radio 204 can also transmit an acknowledgement back to base station 230 by transmitting a message via the transmitter inside of radio 204 which gets sent down via line 256 to antenna 226.

Once the transmission has been sent and acknowledged by base station 230, controller 218 disables the charging of radio battery 206 in order not to completely discharge battery 222 in step 328. In step 330 the routine returns to the start location. One could also design the sequence to have steps 326 and 328 in reverse order (charger 202 stops charging in step 326 prior to transmitting a message) in which case charger 202 should automatically turn on the charging cycle for the duration of the transmission of radio 204 in order to increase the chances of the message being transmitted (i.e. in case radio battery 206 is discharged).

If in step 314 it is determined that vehicle battery 222 is above the first threshold voltage level V1 the routine moves on to step 316. In step 316 the radio battery voltage can be optionally measured to see if it is above a certain threshold level (V3) which is stored inside of controller 218, for example 6.5 volts for a portable radio. If the voltage is above the V3 threshold level, the charging of battery 222 is disabled to conserve the vehicle battery in step 324 and the routine returns to the start location in step 318. If the radio battery voltage level is below the radio threshold level the routine moves to step 332 to determine if radio 204 is presently turned "on" by monitoring line 208 into controller 218 (option B+ line of radio 204).

If step 332 shows that radio 204 is indeed turned "on", charger 202 will charge radio 204 in step 334 in one of a number of different ways which has been programmed into changer 202, or previously selected by the user. For example, charger 202 can charge battery 206 by rapid charging, trickle charging, standby rate charging, rapid charging at a pulsed rate, or any other charging technique which is known in the art. A typical example would be to charge battery 206 using a 10% pulse rate (10% of the time charging/90% not charging). Once the radio battery is charged in step 334 the routine returns to the start location in step 336. If the radio is not "on", in step 332 the radio is charged at a selected rate normally a charge rate lower than that automatically selected in step 334. For example, the radio may be charged at a 2% pulse rate (2% of the time charging). The amount of current being supplied to radio battery 206 will depend on the size capacity of radio battery 206 (e.g. high capacity or medium capacity battery) as determined by controller 218 after measuring the $R_c$ terminal of battery 206.

Figure 4:
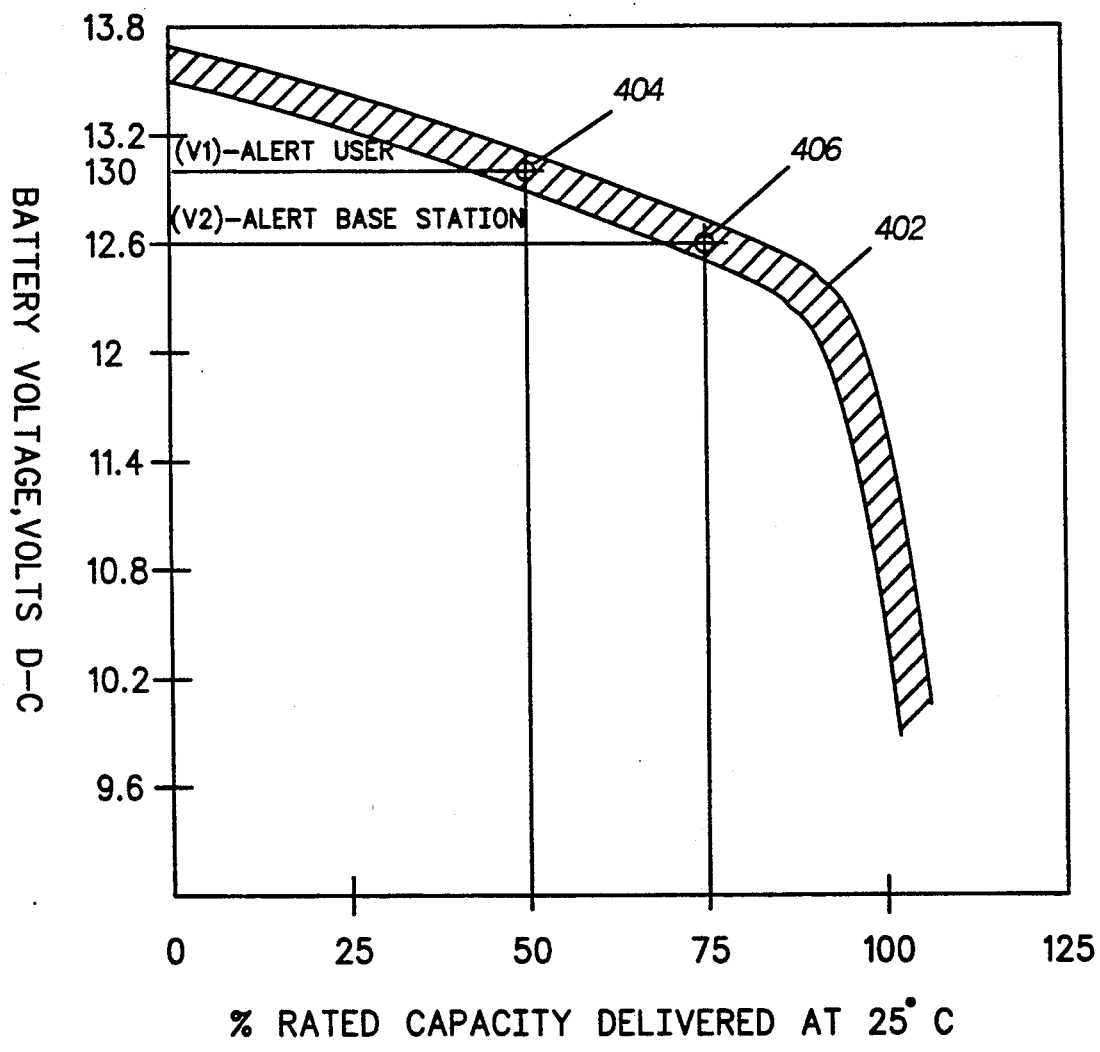
FIG. 4 is a chart showing battery voltage versus percentage of rated capacity delivered for a typical vehicular battery.

FIG. 4 shows a graph 400 of battery voltage versus percentage of rated capacity delivered for a typical vehicular battery such as battery 222. A typical car battery will have a nominal charged voltage range 402 between 13.8 and 13.4 volts when completely charged and will drop to less than 10 volts when completely discharged. In the preferred embodiment the first threshold level (V1) 404 is set at the point where battery 222 is at 50% capacity remaining as shown in FIG. 4. Second threshold level (V2) 406 is preferably set at the point where battery 222 will have 25% of its capacity remaining, enough to be able to start a vehicle under most conditions. A typical example of using the first threshold level is to compare the first threshold level to the voltage level (V1) of the vehicular battery and controller 218 can then produce a first control signal when the vehicular battery voltage level drops below the first threshold level. The first control signal can for example trigger annunciators 224 to annunciate a low battery condition, and/or the first control signal can inform the cutoff means (current regulator 232) via line 244 to discontinue the charging the charging of the electronic device battery (radio battery 206). If one uses a first and second threshold level, charger 202 can for example, inform the user by way of a low battery alert that the first threshold (V1) has been passed, and can terminate charging of radio battery 206 when the second threshold level (V2) is passed. Also, when the V2 level is passed controller 218 can via bus 252 inform radio 204 to transmit a message to base station 230 informing it that the voltage level of vehicle battery 222 has dropped below the V2 threshold.

The points at which the first and second threshold voltage levels V1 and V2 are placed will depend on many variables such as type of vehicle battery 222 being used, the environmental conditions that one is operating in (e.g. heat, cold, etc.), the importance of not having the battery not be able to start the car, the current consumed in charging the radio battery, etc. Both threshold levels are stored in controller 218 memory locations which can be changed by reprogramming the memory locations in controller 218. An alternative implementation of the present invention can have a plurality of threshold levels stored in controller 218 (i.e. a list of thresholds) which can be picked from by the charger user by simply changing a switch on charger 202, thereby allowing the user to modify the threshold levels without having to reprogram the charger. This can be used in situations where charger 202 is being removed and connected to different batteries having different discharge characteristics.

The total time a battery, such as vehicular battery 222, can last without becoming completely discharged will depend on the discharge characteristics and environmental operating conditions of the battery. The lower the amount of current being consumed the longer the discharge time for the particular battery. Different batteries will exhibit different discharge characteristics which need to be looked at when setting the voltage level thresholds.

As been shown the present invention solves the particular problems which present day chargers have of not being able to automatically control the charging of an electronic device battery 206 without having the problem of discharging the vehicle battery 222 in the process. The present invention also allows for the continuation of charging even when the vehicle ignition switch is turned off by continually monitoring the voltage level of the vehicular battery. The charging process is discontinued automatically whenever vehicle battery 222 drops below a stored threshold level. A low battery alert signal is also produced whenever vehicular battery 222 drops below a specified threshold level, thereby informing the user of the immediate problem (i.e. inform him to restart the vehicles engine).

What is claimed is:

1. A vehicular battery operated charger for charging a battery operated radio having a battery and the vehicular battery having a voltage level, the vehicular battery operated charger comprising;
    vehicular battery monitoring means for monitoring the voltage level of the vehicular battery;
    control means responsive to said vehicular battery monitoring means, the control means including a storage means for storing first and second threshold voltage levels, the control means further including a comparison means for comparing the vehicular battery voltage level to the first and second threshold voltage levels stored in the storage means and producing a first control signal when the vehicular battery voltage level drops below the first threshold voltage level;
    charging means responsive to the control means for charging the radio battery;
    cut-off means responsive to the control means for automatically discontinuing the charging of the radio battery when the first control signal is produced by the control means;
    annunciator means responsive to the comparison means for annunciating a low battery condition when the vehicular battery voltage level drops below the first threshold level;
    electronic device monitoring means coupled to the control means for monitoring the voltage level of the radio battery; and
    the comparison means compares the radio battery voltage level to an electronic device voltage threshold level which is stored in the storage means, the control means producing a second control signal when the radio battery voltage level is below the electronic device voltage threshold level, and the control means sends a signal to the radio instructing the radio to transmit a low voltage alert signal when the vehicular battery voltage level falls below the second threshold voltage level.

2. A vehicular battery operated charger for charging a battery operated radio having a battery and the vehicular battery having a voltage level, the vehicular battery operated charger comprising;
    vehicular battery monitoring means for monitoring the voltage level of the vehicular battery;
    control means responsive to said vehicular battery monitoring means, the control means including a storage means for storing first and second threshold voltage levels, the control means further including a comparison means for comparing the vehicular battery voltage level to the first and second threshold voltage levels stored in the storage means and producing a first control signal when the vehicular battery voltage level drops below the first threshold voltage level;
    charging means responsive to the control means for charging the radio battery;
    cut-off means responsive to the control means for automatically discontinuing the charging of the radio battery when the first control signal is produced by the control means;
    annunciator means responsive to the comparison means for annunciating a low battery condition when the vehicular battery voltage level drops below the first threshold level;
    electronic device monitoring means coupled to the control means for monitoring the voltage level of the radio battery; and
    the comparison means compares the radio battery voltage level to an electronic device voltage threshold level which is stored in the storage means, the control means producing a second control signal when the radio battery voltage level is below the electronic device voltage threshold level, the control means also sends a signal to the radio instructing the radio to transmit a low voltage alert signal when the vehicular voltage level falls below the second threshold voltage level, and the cut-off means automatically enables the charging of the radio battery during the transmission of the low voltage alert signal.

3. The vehicular battery operated charger of claim 2, further comprising an annunciator means responsive to the comparison means for annunciating a first low battery condition when the vehicular battery voltage level drops below the first threshold level and for annunciating a second low battery condition when the vehicular battery voltage level drops below the second threshold level.

4. The vehicular battery operated charger of claim 2, further comprising an electronic device condition detector means for determining when the radio is in an "on" state or in an "off" state and for automatically adjusting the rate at which the charging means charges the radio battery depending on which of the two states the radio is in.

5. The vehicular battery operated charger of claim 1, further comprising:
    switching means responsive to the control means for automatically switching to a second vehicular battery for operating the vehicular battery operated charger when the vehicular battery voltage level drops below the first threshold voltage level.

6. A method of charging a battery operated radio having a battery from a vehicular battery operated charger, comprising the steps of:
    charging the radio battery with the vehicular battery operated charger;
    monitoring the voltage level of the vehicular battery;

comparing the vehicular battery voltage level to first and second threshold voltage levels;

generating a first control signal when the vehicular battery voltage drops below the first threshold voltage level;

discontinuing the charging of the radio battery when the first control signal is generated;

automatically annunciating a low battery condition when the vehicular battery voltage level is lower than the first threshold voltage level;

monitoring the voltage level of the radio battery;

comparing the radio battery voltage level to a radio battery voltage threshold level; and generating a second control signal when the radio battery voltage level is below the radio battery voltage threshold level; and transmitting a low voltage alert signal to a base station when the vehicular battery voltage level falls below the second threshold voltage level.

7. The method of charging a battery operated radio of claim 6, further comprising the step of:

automatically annunciating a second low battery condition when the when the vehicular voltage level drops below the second threshold voltage level.

8. The method of charging a battery operated radio of claim 6, wherein the charging of the battery operated radio is automatically enabled during the transmission of the low battery alert signal.

9. A method of charging a battery operated radio having a battery from a vehicular battery operated charger, comprising the steps of:

charging the radio battery with the vehicular battery operated charger;

monitoring the voltage level of the vehicular battery;

comparing the vehicular battery voltage level to first and second threshold voltage levels;

generating a first control signal when the vehicular battery voltage drops below the first threshold voltage level;

discontinuing the charging of the radio battery when the first control signal is generated;

automatically annunciating a low battery condition when the vehicular battery voltage level is lower than the first threshold voltage level;

monitoring the voltage level of the radio battery;

comparing the radio battery voltage level to a radio battery voltage threshold level; and generating a second control signal when the radio battery voltage level is below the radio battery voltage threshold level;

transmitting a low voltage alert signal when the vehicular battery voltage level falls below the second threshold voltage level;

receiving the low voltage alert at a base station; and transmitting a message from the base station to the battery operated radio which causes a task to be performed by the vehicular battery operated charger.

10. The method of charging a battery operated radio of claim 6, further comprising the step of:

automatically annunciating a second low battery condition when the vehicular battery voltage level is lower than the second threshold voltage level.

* * * * *